United States Patent
Madolora et al.

(10) Patent No.: US 12,410,086 B2
(45) Date of Patent: *Sep. 9, 2025

(54) BIOSOLIDS QUALITY AND DEWATERABILITY

(71) Applicant: Premier Magnesia, LLC, West Conshohocken, PA (US)

(72) Inventors: Matthew P. Madolora, Austin, TX (US); J. Peter Ahl, Kennett Square, PA (US)

(73) Assignee: PREMIER MAGNESIA, LLC, Waynesville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,529

(22) Filed: Apr. 18, 2024

(65) Prior Publication Data
US 2025/0074807 A1 Mar. 6, 2025

Related U.S. Application Data

(63) Continuation of application No. 17/715,227, filed on Apr. 7, 2022, now Pat. No. 11,964,889, which is a (Continued)

(51) Int. Cl.
*C02F 11/148* (2019.01)
*C02F 11/04* (2006.01)
*C02F 11/15* (2019.01)

(52) U.S. Cl.
CPC ............ *C02F 11/148* (2019.01); *C02F 11/15* (2019.01); *C02F 11/04* (2013.01); *C02F 2209/06* (2013.01);
(Continued)

(58) Field of Classification Search
CPC ......... C02F 11/148; C02F 11/15; C02F 11/04; C02F 5/02; C02F 2209/06; C02F 2209/07;
(Continued)

(56) References Cited

U.S. PATENT DOCUMENTS

2013/0068695 A1* 3/2013 Wardle .................. C02F 5/02
210/697

OTHER PUBLICATIONS

Definition of "laboratory analysis", CollinsDictionary.com, https://collinsdictionary.com/us/dictionary/english/laboratory-analysis. (Year: 2023).

(Continued)

*Primary Examiner* — Akash K Varma
(74) *Attorney, Agent, or Firm* — Brian J. Colandreo; Jeffrey T. Placker; Holland & Knight LLP

(57) ABSTRACT

In general, a method for treating biosolids may include measuring one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids. A metal salt dosage for amending the wastewater solids may be determined based upon, at least in part, an initial ortho-phosphorus concentration and a reduction capacity of the metal salt. A magnesium compound dosage may be determined for one or more of increasing, decreasing, and maintaining a pH of the wastewater solids. The magnesium compound dosage may be based upon, at least in part, a calculated anticipated change in pH of the wastewater solids resulting from an addition of the metal salts. The method may also include amending the treatment process with the determined metal salt dosage and the determined magnesium compound dosage.

20 Claims, 2 Drawing Sheets

Related U.S. Application Data continuation of application No. 17/671,037, filed on Feb. 14, 2022, now abandoned.

(60) Provisional application No. 63/148,887, filed on Feb. 12, 2021.

(52) U.S. Cl.
CPC ...... *C02F 2209/07* (2013.01); *C02F 2209/10* (2013.01); *C02F 2209/14* (2013.01); *C02F 2209/16* (2013.01); *C02F 2303/22* (2013.01)

(58) Field of Classification Search
CPC .............. C02F 2209/10; C02F 2209/14; C02F 2209/16; C02F 2303/22
USPC ........................................ 210/375, 709, 697
See application file for complete search history.

(56) References Cited

OTHER PUBLICATIONS

Final Office Action issued in related U.S. Appl. No. 17/715,227 on Jun. 6, 2023.
Non-Final Office Action issued in related U.S. Appl. No. 17/671,037 on Feb. 24, 2023.
Non-Final Office Action issued in related Application Serial No. U.S. Appl. No. 17/715,227 on Oct. 28, 2022.
Non-Final Office Action issued in U.S. Appl. No. 17/715,227 on Jun. 9, 2022.
Notice of Allowance issued in related U.S. Appl. No. 17/715,227 on issue Date; Feb. 21, 2024.
Notice of Allowance issued in related U.S. Appl. No. 17/715,227 on issue Date; Mar. 27, 2024.

* cited by examiner

BIOSOLIDS QUALITY AND DEWATERABILITY

CROSS-REFERENCE TO RELATED APPLICATIONS

This application is a continuation of U.S. patent application Ser. No. 17/715,227, filed on 7 Apr. 2022, entitled IMPROVING BIOSOLIDS QUALITY AND DEWATERABILITY, which is a continuation of U.S. patent application Ser. No. 17/671,037, filed on 14 Feb. 2022, entitled IMPROVING BIOSOLIDS QUALITY AND DEWATERABILITY, which claims the benefit of U.S. provisional patent application Ser. No. 63/148,887, filed on 12 Feb. 2021, entitled "METHODS AND COMPOSITIONS FOR IMPROVING BIOSOLIDS DEWATERING AND QUALITY OF BIOSOLIDS FOR RE-USE," the entire disclosure of which is incorporated herein by reference.

TECHNICAL FIELD

The present invention generally relates to wastewater treatment, and more specifically relates to dewatering wastewater solids and improving biosolids quality.

BACKGROUND

Many existing methods for sludge and biosolids conditioning, dewatering and reuse may include a variety of collection and treatment methods and in conventional wastewater treatment, whether municipal or industrial, such methods may generally include organic, inorganic and/or inert components. Primary solids/sludges may generally be made up of organic, inorganic and inert components, and may include biological components as a function of those that enter with the sludge. Waste activated solids/sludges (WAS) may be generally made up of one or more (including a combination of) biomass, flocculated and settled microorganisms and microbial mass. Because these sludges are waterborne, the liquid supernatant component of these sludges may contain constituents (chemical and particulate) that play a role in the overall treatability (for digestion, dewatering, disposal and reuse) of the solids. Additionally, these characteristics may greatly impact the ability to treat and dispose of sludges and processed products thereof.

SUMMARY

According to an implementation a method for treating biosolids may include measuring one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids. The method may also include determining a metal salt dosage for amending the wastewater solids based upon, at least in part, an initial ortho-phosphorus concentration and a reduction capacity to reduce one or more of a calculated Omega-S value and a Struvite Precipitation Index value to a specified level. The method may also include determining a magnesium compound dosage for amending the wastewater solids to achieve a desired condition within the wastewater solids. The desired condition may include one or more of increasing a pH of the wastewater solids, decreasing a pH of the wastewater solids, and maintaining a pH of the wastewater solids relative to the measured pH. The magnesium compound dosage may be based upon, at least in part, a calculated anticipated change in pH of the wastewater solids resulting from an addition of the metal salts. The method may further include amending the treatment process with the determined metal salt dosage and the determined magnesium compound dosage.

One or more of the following features may be included. Measuring one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids may include measuring in a plurality of locations within the treatment process. The plurality of locations within the treatment process may include one or more of an input to a sludge storage tank, a sludge storage tank, an output from a sludge storage tank, a digester vessel, an input to a dewatering process, and an output from a dewatering process.

The wastewater solids may include one or more of primary clarifier sludges and Waste Activated Sludges. The wastewater solids may include one or more of pre-digestion sludges, post-digestion sludges, sludges in storage, wastewater treatment stream outputs, biosolids, pre-dewatered biosolids, and post-dewatered biosolids.

The metal salt may include one or more of: ferrous salts, ferric salts, and aluminum salts, and combinations thereof. The magnesium compound may include one or more of magnesium hydroxide and magnesium oxide, and combinations thereof. The magnesium compound may include a combination of magnesium compounds having differing reactivities.

Determining a magnesium compound dosage for amending the wastewater solids to achieve a desired condition within the wastewater solids may include determining a dosage of a combination of the magnesium compound and an additional alkaline agent. The additional alkaline agent may include one or more of a calcium, sodium, and potassium based hydroxide, carbonate, bicarbonate, and combinations thereof.

The method may also include selecting a polymer dewatering agent dosage for a dewatering process based upon, at least in part, a calculated pH achieved by the determined metal salt dosage and the determined magnesium compound dosage.

Amending the treatment process with the determined metal salt dosage and the determined magnesium compound dosage may include adding the determined metal salt dosage and the determined magnesium compound dosage at one or more locations in the treatment process. The one or more locations in the treatment process may include one or more of an input to a sludge storage tank, a sludge storage tank, an output from a sludge storage tank, a digester vessel, an input to a dewatering process, and an output from a dewatering process.

The method may also include measuring one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids downstream of an amendment addition location. One or more of the metal salt dosage and the magnesium compound dosage may be adjusted based upon, at least in part, the downstream measurement.

Amending the treatment process may also include adding one or more of a polymer dewatering agent (cationic, anionic, nonionic, polyionic), an oxidizer (sodium or calcium hypochlorite, peroxide, chlorine dioxide, ozone), a cation amendment (sodium, calcium, potassium, magnesium, iron, aluminum, etc, salts), a scale control amendment (e.g., polymeric dispersants, chelants), and a precipitation control amendment (e.g., polymeric dispersants, chelants), and combinations thereof, to the treatment process for the wastewater solids.

The method may also include measuring hydrogen sulfide gas concentration within the wastewater solids. The wastewater solids may include anaerobically digested sludge held in a storage tank. Determining one or more of the metal salt dosage for amending the wastewater solids may include calculating a dosage of one or more of metal salt and magnesium compound to reduce the hydrogen sulfide concentration to below a specified level.

The method may also include calculating a desired dosing of one or more of the metal salt, the magnesium compound, and a polymer dewatering agent based upon, at least in part, the calculated Struvite Precipitation Index for the biosolids to increase the dewaterability of the biosolids. The biosolids may include biosolids within an anaerobic digester.

Measuring one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids may include measuring at multiple locations within one or more of a biological reactor vessel and a storage tank. The method may further include calculating a Struvite Precipitation Index value for at least a portion of the multiple locations within one or more of the biological reactor vessel and the storage tank. Determining the magnesium compound dosage may include calculating the magnesium compound dosages to maintain an elevated Struvite Precipitation Index value for at least a portion of the multiple locations within one or more of the biological reactor vessel and the storage tank to cause preferential struvite formation in one or more predetermined locations. The method may further include adding the magnesium compound to the biological reaction vessel to cause the preferential struvite formation in the one or more predetermined locations.

Amending the biosolids with one or more of the metal salts and the magnesium compound may include utilizing a reaction facilitation device including one or more electrical, mechanical, electro-mechanical, and electro-magnetic devices to facilitate formation of suspended particles include one or more of the metal salts and the magnesium compound. The reaction facilitation device may be configured to impart a force, field, or energy on one or more compounds within the treatment process using vibrations to facilitate more complete reactions. The reaction facilitation device may be configured to impart a force, field, or energy to influence alignment of atoms or molecules of one or more of water in the treatment process and compounds within the treatment process to facilitate a more complete reactions. The reaction facilitation device may be configured to impart a force, field or energy to facilitate reaction products within the treatment process to form preferentially as suspended particulates.

DETAILED DESCRIPTION OF EXAMPLE EMBODIMENTS

Figure 1:
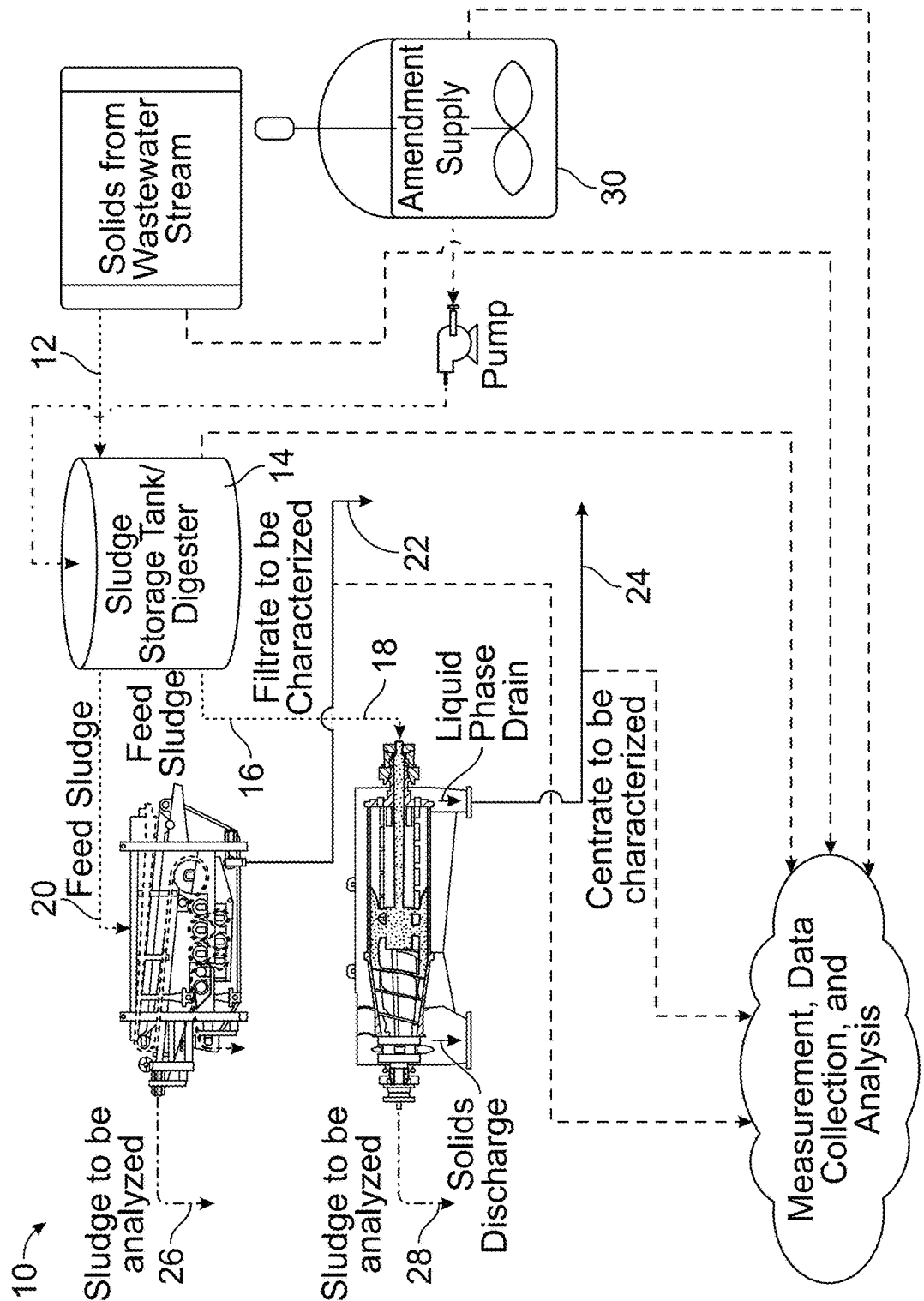
FIG. 1 diagrammatically depicts a treatment process for wastewater solids, according to an example embodiment.

In general the present disclosure may provide various methods and compositions that may be used in treating wastewater and/or wastewater treatment products. In some implementations consistent with the present disclosure, various systems, method, and compositions may be provided that may improve the dewatering of biosolids from various wastewater treatment processes. In some example implementations, the dewatering of biosolids may be improved while reducing and/or optimizing the usage of polymer dewatering agents. The reduction and/or optimization of the usage of polymer dewatering agents may allow the cost associated with dewatering biosolids to be reduced. Further, in some implementations, the improving the dewatering of biosolids may reduce subsequent costs, e.g., as may be associated with the transportation and/or disposal of the biosolids. In some embodiments, costs may be reduced, at least in part by allowing more complete dewatering of the biosolids. Such more complete dewatering of the biosolids may, for example, reduce the weight of the final dewatered biosolids. In some implementations, systems, methods, and compositions may be provided that may improve the quality of biosolids, e.g., to improve opportunities for subsequent disposal and/or reuse based on the characteristics of the nutrient value, odor, public and/or environmental health, and the like. Further, in some implementations, the present disclosure may provide systems, methods, and compositions that may improve recoverability and reusability of water, gas, and solids associated with various wastewater treatment processes. Consistent with some example embodiments, the present disclosure may utilize new levels of data metrics, monitoring and utilization of data in order to improve, and in some cases, optimize, not just the use of chemistry in the treatment plants, but also to improve, and in some cases, optimize, the overall value of the plant in its production of water, gas and solid recoverables.

Various characteristics of the biosolids (e.g., include solid components within a wastewater stream and/or solid components within at least partially processed wastewater) may effect dewaterability of sludge (e.g., at least semisolid material that is a byproduct of wastewater treatment). Further, the dewaterability of sludge can impact opportunities for disposal and reuse due to nutrient value, odors, and public or environmental health. Consistent with some implementations of the present disclosure, sludge may be preconditioned or treated using agents such as chemicals or polymers, or preconditioned physically via mechanical, thermal or pressurized methods, which may facilitate the sludge collection and sedimentation process during wastewater treatment and/or subsequent refinement of biosolids. Further, in some implementations, sludge may be digested or stabilized chemically or biologically, and then ultimately dewatered (e.g., solids and liquid may be separated from the sludge). The solids and liquid streams may each represent opportunities for recovery and reuse, and/or are otherwise be recycled back into the treatment process or the environment.

Consistent with the present disclosure, in some instances, the dewaterability of sludge may be influenced by chemical compositions of the water carrying the sludge and/or the particulate charge nature (e.g., positively charged or negatively charged) of the sludge itself. Chemical parameters such as pH and alkalinity may play a significant role in dewaterability and bulking characteristics of the sludge. Consistent with the present disclosure, chemical parameters such as divalent cation concentrations, multivalent cations and multivalent anions and their ratios to each other and/or monovalent cation concentrations may affect overall dewaterability. These chemical parameters may also include, but are not limited to, pH, alkalinity, Mg, Ca, Na, K, $NH_4$ (ammonium), and OP (ortho-phosphate) concentrations. Consistent with some implementations of the present disclosure, prescribed concentration relationships and ratios of these chemical parameters may be utilized as indicators of dewaterability and may be included in developing and/or shaping more specific treatment programs.

Further, consistent with some implementations of the present disclosure, methods may be provided for using some or all of the foregoing parameters to improve and optimize dewaterability and chemical use in the dewatering, refinement, and/or treatment of wastewater (including any sludge, biosolids, or the like that may be produced therefrom). As used herein, biosolids may include any solid and/or semi-solid components that may be included in wastewater, sludge separated in wastewater, and/or solid or semi-solid components separated from wastewater and/or sludge. Biosolids herein may, or may not, include organic matter and/or microorganisms. In some implementations consistent with the present disclosure, one or more of the following may be achieved and/or included: improve dewaterability of biosolids, reduced polymer use during dewatering and/or other treatment wastewater/wastewater products, reduced metal salt use (e.g., Fe and Al metal salts) in finished biosolids products, Mg supplementation to finished solids products, increased nutrient value (e.g., phosphorus and nitrogen nutrient values), utilization of data collection tools and resources to improve and/or optimize all chemical use in the wastewater/biosolids treatment and to improve and/or optimize the quality of finished solids products, utilization of modeling tools, such as the Struvite Precipitation Index, (Barnes, Bowers, Madolora), utilization of technology devices as a pre-conditioning step prior to administration of magnesium compounds (such as, but not limited to, magnesium hydroxide or oxide). The preconditioning of the water, wastewater, or chemical components of the water or wastewater may increase the effectiveness or efficiency of the magnesium compounds. Furthermore, the methods of data collection and utilization of modeling and calculation tools used, and outlined herein, may be utilized to validate the change of efficiency and optimal use of magnesium compounds.

Consistent with some example embodiments, methods may be provided for conditioning and amending wastewater solids, which may include one, or both, organic and inorganic sludges, e.g., for the purpose of improving solids dewaterability and reducing polymer use. Consistent with some example embodiments, methods may be provided for conditioning and amending wastewater solids, which may include one, or both, organic and inorganic sludges, e.g., for the purpose of improving solids content and composition for beneficial reuse, which may include, but is not limited to, land application for disposal and land application for agricultural and vegetative reuse. Consistent with some example embodiments, methods may be provided for conditioning and amending wastewater solids, pre-digestion, which may include one, or both, of organic and inorganic sludges. Conditioning and amending the wastewater solids may, for example, be directed to improving solids dewaterability and/or reducing polymer use (e.g., during dewatering). Pre-digested sludges may include, but are not limited to, primary clarifier sludges, Waste Activated Sludges (WAS, which may include Biological Phosphorus Process Sludge and Biological Nitrogen Process Sludge), or combinations of both. Further, pre-digested sludges may also include other sludges that contain combinations of organic and inorganic content prior to an aerobic or anaerobic digester. Further, consistent with some example embodiments, methods may be provided for conditioning and/or amending wastewater solids, pre-digestion, which may include one, or both, of organic and inorganic sludges. In some embodiments, conditioning and/or amending wastewater solids may be directed to improving solids content and/or composition for beneficial reuse (e.g., which may include, but is not limited to, land application for disposal and land application for agricultural and vegetative supplementation). Pre-digested sludges may include, but are not limited to, primary clarifier sludges, WAS sludges, or combinations of both, and may include other sludges that contain combinations of organic and inorganic content prior to an aerobic or anaerobic.

Consistent with some example embodiments, methods may be provided for conditioning and/or amending wastewater solids, post-digestion, which may include one, or both, of organic and inorganic sludges. In some implementations conditioning and/or amending wastewater solids post digestion may be directed at improving solids dewaterability and/or reducing polymer use (e.g., as part of the dewatering process). Post-digested sludges may include, but not limited to, primary clarifier sludges, WAS sludges, or combinations of both, and may include other sludges that contain combinations of organic and inorganic content. Additionally, post-digested sludges may include additional free nutrients that may be exposed or released as a result of the digestion process. In some embodiments, these nutrients may have reuse value, either as a component of biosolids removed from the plant, or as nutrients recovered in other forms. Further, consistent with some example embodiments, methods may be provided for conditioning and/or amending wastewater solids, post-digestion, which may include one, or both, of organic and inorganic sludges. In some implementations, conditioning and/or amending wastewater solids post digestion may be directed to improving solids content and composition for beneficial reuse, which may include, but is not limited to, land application for disposal and land application for agricultural and vegetative reuse. Post-digested sludges may include, but are not limited to, primary clarifier sludges, WAS sludges, or combinations of both, and may include other sludges that contain combinations of organic and inorganic content. Additionally, post-digested sludges may include additional free nutrients exposed or released as a result of the digestion process. These nutrients may have reuse value, either as a component of biosolids removed from the plant, or as nutrients recovered in other forms.

According to some embodiments consistent with the present disclosure, methods may be provided for measuring specific components of waterborne solids that may affect dewaterability and that can be used to determine suitable and/or optimal amendments for improving dewaterability. Consistent with some example embodiments, methods may be provided for measuring specific components of waterborne solids that affect dewaterability and that can be used to determine suitable and/or optimal amendments that can produce biosolids for re-use tailored to soil requirements for various land application sites. Consistent with some example embodiments, methods may be provided for utilizing automated data collection devices to collect data in non-conventional locations to devise treatment programs for water and/or wastewater. Data collected may further be utilized in algorithms and models to devise treatment programs for specific utilities and their operational conditions, or for acceptors of biosolids, or nutrients, designated for re-use and the characteristic most desired by their specific applications.

According to some implementations consistent with the present disclosure, methods may be provided for using metric tools and equations for calculating precipitation potential for various scales including, but not limited to, struvite, calcium carbonate, hydroxyapatite, etc. In some implementations, such metrics and tools may be used to establish initial parameters for combination of proposed chemistries (e.g., various combinations of conditioning and/or amending compounds to be added to the wastewater, sludges, and/or biosolids). Omega-S, SPI (Struvite Precipitation Index), solubility product of struvite, solubility product of hydroxyapatite, solubility product of calcium and magnesium carbonates, etc. may be among the metric tools to be considered in devising a magnesia based chemical treatment regime. As is known, in general Omega-S and SPI values may be generally indicative of, and/or the level of, struvite and/or hard scale forming conditions within the sludge. Consistent with some implementations, modelling and/or calculation tools may facilitate the design of operating conditions that may limit, reduce and/or eliminate the propensity of forming struvite as a hard scale on one hand, and/or alternatively designing operating conditions that allow for struvite formation in a recoverable suspended particulate form, either discretely or combined with the biosolids. Additionally, consistent with some example embodiments, methods may be provided for using automated data collection devices in conjunction with the metric tools and equations in order to provide rapid and/or "real time" operational conditions associated with one or more wastewater treatment processes (e.g., which may include, but are not limited to, treatment processes for raw wastewater streams, treatment processes for sludges, treatment processes for biosolids, and the like). Such rapid and/or real time operational conditions may allow the modification, control, improvement, and/or optimization of chemical amendments and/or conditioners to achieve desired, improved, and/or optimal performance for conditioning and dewatering of biosolids.

Consistent with an illustrative example embodiment, a method for treating biosolids may include measuring one or more of pH, alkalinity, magnesium concentration, orthophosphorus concentration, total phosphorus content, ammonia content, total nitrogen content, total solids content, total volatile solids, polymer consumption, and metal salt consumption associated with a treatment process for wastewater solids. In some particular implementations, measuring one or more of pH, alkalinity, magnesium concentrations, orthophosphorus concentration, total phosphorus content, ammonia content, total nitrogen content, total solids content, total volatile solids, polymer consumption, and metal salt consumption may include one or more of taking the measurements in situ (e.g., utilizing probes and/or other appropriate measurement devices that may be at least partially installed at one or more locations within the treatment process and/or treatment facility), and/or taking measurements by way of lab sampling (e.g., samples of wastewater streams, sludges, etc. may be collected and analyzed in a lab, etc.). In one particular illustrative example embodiment, the treatment process for wastewater solids may include, but is not limited to, a dewatering process for sludge that has been anaerobically digested and stored in a sludge holding tank.

In one particular illustrative example embodiment, further data associated with the treatment process and/or operation of a treatment facility may be collected and reviewed, including, but not limited to, current costs for dewatering of biosolids, including but not limited to the cost of polymer use, the cost of owning and operating dewatering equipment such as centrifuges, filter presses, belt presses, the cost of transporting dewatered sludge, and the cost of disposal via re-use or landfill. Further, in an embodiment, data may also be collected, including, but not limited to, operational parameters and chemistry such as cation concentrations, anion concentrations, solids concentration, thickened solids concentration, pH, VFAs (volatile fatty acids), ORP (oxidation reduction potential), etc. of the sludge stored in the sludge storage tank.

Consistent with some implementations, measuring one or more of pH, alkalinity, magnesium concentration, orthophosphorus concentration, total phosphorus content, ammonia content, total nitrogen content, total solids content, total volatile solids, polymer consumption, metal salt consumption, and/or any other measurements and/or data associated with a treatment process for wastewater solids may include measuring in a plurality of locations within the treatment process. For example, and referring to FIG. 1, the plurality of locations within the treatment process 10 may include one or more of an input to a sludge storage tank 12, a sludge storage tank 14, an output from a sludge storage tank 16, a digester vessel (which for the sake of simplicity is illustrated commonly located with the sludge storage tank 12, but which may be separate from the sludge storage tank, either upstream or downstream, and/or may replace the sludge storage tank, and/or may be omitted in favor of the sludge storage tank), an input to a dewatering process (e.g., input 18 to centrifuge dewatering process and/or input 20 to belt filter press dewatering process, or other suitable dewatering process), and an output from a dewatering process (e.g., filtrate output 22, centrate output 24, belt filter press output 26, and/or centrifuge output 28).

Consistent with various embodiments, the wastewater solids may include one or more of primary clarifier sludges and Waste Activated Sludges. Further, consistent with various embodiments, the wastewater solids may include one or more of pre-digestion sludges, post-digestion sludges (anaerobically digested, aerobically digested, and/or a combination thereof), sludges in storage, wastewater treatment stream outputs, biosolids, pre-dewatered biosolids, and post-dewatered biosolids.

In one particular illustrative example embodiment, initial pH measurements, and orthophosphate (OP) concentrations of the sludge supernatant may be utilized to provide valuable insight into polymer demands and dewatering equipment operational set points. For example, typically, these measurements may be found within the range of pH 6.0-8.5 and OP (orthophosphate —$PO_4^{-3}$) concentrations between 5 and 1000 mg/L. The values of these parameters may be inserted into one of the appropriate metric tools or equations noted above.

Consistent with some example embodiments, the method may also include determining a metal salt dosage for amending the wastewater solids based upon, at least in part, an initial ortho-phosphorus concentration and a reduction capacity to reduce one or more of a calculated Omega-S value and a Struvite Precipitation Index value to a specified level. Consistent with some illustrative example embodiments, the metal salt may include one or more of: ferrous salts (e.g., ferrous sulfate, ferrous chloride, etc.), ferric salts (e.g., ferric sulfate, ferric chloride, etc.), aluminum salts (e.g., aluminum sulfate, alum, etc.), and combinations thereof. It will be appreciated that various additional and/or alternative metal salts may be utilized. In some implementations, the metal salts may be utilized, at least in part, as flocculating agents, and/or may be utilized for other suitable purposes.

Consistent with the present disclosure, in some embodiments a magnesium compound dosage may be determined for amending the wastewater solids to achieve a desired condition within the wastewater solids. In some particular illustrative embodiments, the desired condition may include one or more of increasing a pH of the wastewater solids, decreasing a pH of the wastewater solids, and maintaining a pH of the wastewater solids relative to the measured pH. The magnesium compound dosage may be based upon, at least in part, a calculated anticipated change in pH of the wastewater solids resulting from an addition of the metal salts. For example, metal salts may have a calculable and measurable acid component, the magnesium compound dosage may be determined, at least in part, based on the desired pH result that will have a consequential desired result on polymer dewatering agent usage and dewaterability.

The magnesium compound may include one or more of magnesium hydroxide and magnesium oxide, and combinations thereof. The magnesium compound may include a combination of magnesium compounds having differing reactivities. For example, in one illustrative example the magnesium compound may include a relatively highly reactive grade of magnesium hydroxide. Further in one particular implementation, a relatively highly reactive grade of magnesium hydroxide may exhibit Specific Surface Area (SSA)>10 $m^2$/gram. In some implementations, the magnesium hydroxide composition may include a relatively low reactive grade of magnesium hydroxide. In one such particular embodiment, the relatively low reactive grade of magnesium hydroxide may exhibit and SSA<10 $m^2$/gram. In some implementations, combinations of relatively high reactive grades and relatively low reactive grades of magnesium hydroxide may be utilized. Similarly, in some embodiments, the magnesium compound may include relatively high reactive grades of magnesium oxide. In some particular embodiment, relatively high reactive grades of magnesium oxide may exhibit SSA of between about 25 to about 500 $m^2$/gram. Further, in some implementations, the magnesium compound may include magnesium oxide of a relatively low reactive grade. In one particular implementation, a relatively low reactive grade of magnesium oxide may exhibit an SSA<25 $m^2$/gram. Further, in some embodiments, combinations of relatively high and relatively low reactivity grades of magnesium oxide may be utilized. Further, in some implementations the magnesium compound may include combinations of magnesium hydroxide (of relatively high or low reactive grades and/or combinations thereof) and magnesium oxide (of relatively high or low reactive grades and/or combinations thereof).

In some implementations, a magnesium compound may be utilized alone as an alkaline agent. Further, in some illustrative example embodiments, the magnesium compound may be utilized in combination with one or more other alkaline agents. Consistent with some such implementations, determining a magnesium compound dosage for amending the wastewater solids to achieve a desired condition within the wastewater solids may include determining a dosage of a combination of the magnesium compound and an additional alkaline agent. Consistent with some illustrative example embodiments, the additional alkaline agent may include one or more of a calcium, sodium, and potassium based hydroxide, carbonate, bicarbonate, and combinations thereof. It will be appreciated that additional and/or alternative additional alkaline agents may be utilized.

The method may also include selecting a polymer dewatering agent dosage for a dewatering process based upon, at least in part, a calculated pH achieved by the determined metal salt dosage and the determined magnesium compound dosage. For example, and as generally mentioned above, the metal salts may have a calculable and measurable acid component, the magnesium compound (as well as any additional alkaline agents and/or other additions or amendments) may be selected to achieve a pH that may allow for reduced and/or optimized usage of polymer dewatering agents. As such, the dosage of the polymer dewatering agent may be selected based upon the calculated pH achieved by the various additions and/or amendments, which may allow a sufficient dosage of polymer dewatering agent to be determined, without using more (or at least substantially more) of the polymer dewatering agent than is necessary.

Additionally, the method may further include amending the treatment process with the determined metal salt dosage and the determined magnesium compound dosage. Further, in some illustrative example embodiments, amending the treatment process may also include adding one or more of a polymer dewatering agent (e.g., a cationic, anionic, polyionic and/or non-ionic polymeric dewatering agent), an oxidizer (e.g., sodium or calcium hypochlorite, peroxide, chlorine dioxide, ozone, etc.), a cation amendment (e.g., sodium, calcium, potassium, magnesium, iron, aluminum, etc., and/or salts thereof, etc.), a scale control amendment (e.g., polymeric dispersants, chelants, etc.), and a precipitation control amendment (e.g., polymeric dispersants, chelants, etc.), and combinations thereof, to the treatment process for the wastewater solids. That is, for example, the various additional and/or amendments that may be utilized to condition or treat the wastewater solids (and/or wastewater stream, and/or wastewater liquid components) may be added to the treatment process, including, but not limited to, the metal salts, the magnesium compound, any additional alkaline agents, polymer dewatering agents, other salts (e.g., magnesium chloride, magnesium sulfate, magnesium nitrate, calcium chloride, calcium sulfate, calcium nitrate, etc.). Consistent with some implementations, amending the treatment process with the determined metal salt dosage and the determined magnesium compound dosage (as well as any additional compounds, amendments, conditioning agents, etc.) may include adding the determined metal salt dosage and the determined magnesium compound dosage at one or more locations in the treatment process. For example, and referring again to FIG. 1, the plurality of locations within the treatment process 10 may include one or more of an input to a sludge storage tank 12, a sludge storage tank 14, an output from a sludge storage tank 16, a digester vessel (which for the sake of simplicity is illustrated commonly located with the sludge storage tank 12, but which may be separate from the sludge storage tank, either upstream or downstream, and/or may replace the sludge storage tank, and/or may be omitted in favor of the sludge storage tank), an input to a dewatering process (e.g., input 18 to centrifuge dewatering process and/or input 20 to belt filter press dewatering process, or other suitable dewatering process), and an output from a dewatering process (e.g., filtrate output 22, centrate output 24, belt filter press output 26, and/or centrifuge output 28). While FIG. 1 generally depicts Amendment Supply 30 as including a single container pumping amendments to the sludge storage tank/digester 14, it will be appreciated that this is intended for simplicity of depicts. The amendment supply may include a plurality of discrete sources (e.g. each of which may include a separate agent or compound to be added and/or a combination of two or more agents or compounds to be added). Additionally, as noted above, the various agents, compounds, etc., may be added to a variety of locations within the treatment process.

The method may also include measuring one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids downstream of an amendment addition location. One or more of the metal salt dosage and the magnesium compound dosage may be adjusted based upon, at least in part, the downstream measurement. For example, as generally discussed above, various additives, additions, conditioning agents, and the like may be added to the treatment process based upon, at least in part, one or more measured characteristics and one or more desired and/or calculated outcomes and/or changes in characteristics of the treatment process/wastewater solids. Consistent with some implementations, characteristics of the treatment process/wastewater solids may be measured downstream from a point of introduction of the various amendments. Measuring the characteristics of the treatment process/wastewater solids downstream from the point of introduction of the various amendments may provide feedback to ensure a desired result is being achieved by the amendments added to the treatment process/wastewater solids. Subsequent adjustment of the any of the determined dosages of any of the addition, amendments, conditioning agents, and the like may be based upon, at least in part, the downstream measurements.

In some particular illustrative example embodiments, methods consistent with the present disclosure may also include measuring hydrogen sulfide gas concentration within the wastewater solids. For example, in some embodiments, the wastewater solids may include anaerobically digested sludge held in a storage tank (e.g., storage tank 14 in FIG. 1). Consistent with some such embodiments, anaerobic digester gas (e.g., methane) may be recovered for energy purposes. In some such situations, additional data related to digester performance and gas quality may be gathered. For example, initial (i.e., prior to the addition of post-digestion amendments) pH measurements, and orthophosphate (OP) concentrations of the sludge supernatant may provide valuable insight into polymer demands and dewatering equipment operational set points. Consistent with some embodiments, typically, these measurements may be found within the range of pH 6.0-8.5 and OP concentrations between 5 and 1000 mg/L. Further, initial pH measurements, $NH_3$, sulfide in the sludge, and sulfides in the digester gas may provide valuable insight into the quality of the digester gas produced. Consistent with some illustrative embodiments, typically, these pH measurements may be found within the range of pH 6.0-8.0, ammonia concentrations between 5 and 2500 mg/L, dissolved sulfides between 0.5 and 1000 mg/L in the sludge and $H_2S$ gas between 0 and 5000 PPM. Consistent with the present disclosure, in some embodiments, the selection and dosing of magnesium compound and metal salt may be based, at least in part, on these initial measurements. For example, the dosing of magnesium compound and the metal salt may be based, at least in part, on OP or $H_2S$ concentrations. In one such example, an $H_2S$ gas concentration may be measured as part of baseline data collection. A dosing quantity of metal salt, or magnesium compound, and/or combination of both metal salt and magnesium compound may be selected to reduce $H_2S$ to a specified level. In another example, an OP concentration may be measured as part of baseline data collection. A dosing quantity of metal salt, or magnesium compound, and/or combination of both metal salt and magnesium compound may be selected to reduce OP to a specified level. Further, in another example, OP and $H_2S$ concentration may be measured as part of baseline data collection. A dosing quantity of metal salt, or magnesium compound, and/or combination of both metal salt and magnesium compound may be selected to reduce both OP and $H_2S$ to a specified level. Accordingly, in some illustrative example embodiments consistent with the present disclosure, determining one or more of the metal salt dosage for amending the wastewater solids may include calculating a dosage of one or more of metal salt and magnesium compound to reduce the hydrogen sulfide concentration to below a specified level. For example, in some embodiments, metal salts may be generally dosed in a stoichiometric ratio to sulfides present. In some such implementations, a desired pH of the sludge may be between about 7 to about 9. Synergistically, improved H2S gas reduction can be achieved with lower than stoichiometric metal salts and a pH lower than about 8. However, it will be appreciated that other implementations may be achieved.

In an illustrative example embodiment consistent with the present disclosure, the operating conditions of an anaerobic digester (e.g., digester 14, shown in FIG. 1) may be considered in relation to the current dewatering operations of a treatment process. Consistent with some such embodiments, amending the operating conditions may be utilized to improve and/or optimize dewatering performance of the wastewater solids (e.g., to achieve a greater degree of dewatering and/or to achieve satisfactory dewatering while reducing the amount and/or cost of dewatering agents and/or operations implemented to achieve the dewatering). Some such implementations may utilize the StruPI (struvite precipitation index, also known as SPI) to generate values which may then be utilized to design a dewatering program utilizing magnesium compounds, or combinations of magnesium compounds and/or metal salts and/or polymer dewatering agents, to improve and/or optimize solids dewaterability and improve the overall quality of the biosolids. Consistent with some such implementations, the present disclosure may include calculating a desired dosing of one or more of the metal salt, the magnesium compound, and a polymer dewatering agent (e.g., one or more of an anionic, cationic, polyionic, and/or non-ionic polymer dewatering agent, etc.) based upon, at least in part, the calculated Struvite Precipitation Index for the biosolids to increase the dewaterability of the biosolids. The biosolids may include biosolids within an anaerobic digester.

In another embodiment consistent with the present disclosure, operating conditions of any biological reactor may considered. The biological reactor may be configured as a plug flow reactor, as a batch reactor, as a sequential batch reactor, and/or as combinatorial configurations that include characteristics of several types of reactors. In some such embodiments, a treatment methodology may be based, at least in part, on understanding the biological and chemical status of the reactor to which data is to be collected and treatments to be administered.

According to a further example embodiment consistent with the present disclosure, solids to be dewatered may have been amended with a metal salt prior to dewatering, and/or metal-salt amended solids may have been stored in a storage vessel prior to a dewatering process. In some implementations, the storage vessel (e.g., storage vessel 14 in FIG. 1) may be unmixed, continuously mixed, and/or intermittently mixed, may exhibit complete mix characteristics or plug flow reactor characteristics, such that chemical characteristics and/or measured parameters may be uniform throughout the entire reaction vessel (complete mix) or the chemical characteristics and/or measured parameters may exhibit a concentration gradient (plug flow or similar) when measured at various points within the reactor. Evaluation of the mixed status of the reaction vessel may be considered in a program to implement treatment objectives using magnesium compounds, and predictive models to improve the process of dewatering and/or improve the desirable qualities of the resultant dewatered cake.

Consistent with some such particular implementations, the addition of the metal salt to the solids generally may have effects including, but not limited to: reduced pH of the bulk solution of solids, reduced concentration of OP (ortho-phosphorus), reduced concentration of TP (total phosphorus), and/or reduced concertation of sulfides and $H_2S$. In an illustrative example embodiment, one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids may be measured at multiple locations within one or more of the biological reactor vessel and the storage tank. In some embodiments, such measurements may provide feedback regarding the mix status of the reactor. The values obtained from these measurements may then be used to calculate SPI values for at least a portion of the multiple locations within one or more of the biological reactor vessel and the storage tank (e.g., calculate SPI values for at those points in the reactor at which measurements were taken). Magnesium compound dosing and location may then be determined and adjusted and/or optimized using magnesia dissolution rate kinetics to control pH change and Mg and OP concentrations, which may impact polymer selection, polymer dose and overall dewaterability of the solids. Further, in some embodiments, controlling the pH and Mg and OP concentrations may, at least in part, be directed to maintaining particular SPI values in preferred locations within the reactor vessel. In some implementations, SPI values may be maintained at higher levels to preferentially form struvite in desirable locations, such as within the sludge matrix, or in suspension in the solids storage tank. In some implementations SPI values may be maintained at lower levels where struvite scaling may be a concern. In some such situations, the dosing quantity and location of magnesia may be determined by feeding magnesium compound to achieve the desired SPI values in preferred locations. Accordingly, in some embodiments consistent with the present disclosure, determining the magnesium compound dosage may include calculating the magnesium compound dosages to maintain an elevated Struvite Precipitation Index value for at least a portion of the multiple locations within one or more of the biological reactor vessel and the storage tank to cause preferential struvite formation in one or more predetermined locations. Additionally, the magnesium compound may be added to the biological reaction vessel to cause the preferential struvite formation in the one or more predetermined locations (e.g., within the sludge matrix, ins suspension in the solids storage tank, etc.).

According to another embodiment consistent with the present disclosure, the solids to be dewatered may not have been amended with a metal salt prior to dewatering process, and/or may the unamended solids may be stored in a storage vessel prior to the dewatering process. In some particular implementations, the storage vessel may be unmixed, continuously mixed, and/or intermittently mixed, may exhibit complete mix characteristics or plug flow reactor characteristics, such that chemical characteristics and/or measured parameters may be uniform throughout the entire reaction vessel (complete mix) or the chemical characteristics and/or measured parameters may exhibit a concentration gradient (plug flow or similar) when measured at various points within the reactor. Evaluation of the mixed status of the reaction vessel may be considered in the program to implement treatment objectives using the magnesium compound, and predictive models to improve the process of dewatering and/or the desirable qualities of the resultant dewatered cake. In some such embodiments, measuring pH, Alkalinity, Mg, $NH_3$, OP at multiple locations throughout the reactor may provide feedback into the mix status of the reactor. The values obtained from these measurements may then be used to generate and/or calculate SPI values at those points in the reactor. Magnesium compound dosing and location may then be determined and adjusted and/or optimized using magnesium compound dissolution rate kinetics to control pH change and Mg and OP concentrations, which may impact polymer dewatering agent selection, polymer dose and overall dewaterability of the solids. Further, in some such embodiments, the intent of controlling the pH and Mg and OP concentrations may be to maintain particular SPI values in preferred locations. In some implementations, SPI values may be maintained at higher levels to preferentially form struvite in desirable locations, such as within the sludge matrix, or in suspension in the solids storage tank. In some implementations SPI values may be maintained at lower levels where struvite scaling may be a concern. Further, the dosing quantity and location of the magnesium compound may be determined by feeding the magnesium compound to achieve the desired SPI values in preferred locations.

In another embodiment consistent with the present disclosure, solids to be dewatered may contain a chemical composition of the water that include, but are not limited to, parameters such as pH, alkalinity, $NH_3$, OP, Ca, Mg, $CO_3^{-2}$, Fe, Al. Amending the biosolids with one or more of the metal salts and the magnesium compound may include utilizing a reaction facilitation device including one or more electrical, mechanical, electro-mechanical, and electro-magnetic devices to facilitate formation of suspended particles include one or more of the metal salts and the magnesium compound. The reaction facilitation device may be configured to impart a force, field, or energy on one or more compounds within the treatment process using vibrations to facilitate more complete reactions. The reaction facilitation device may be configured to impart a force, field, or energy to influence alignment of atoms or molecules of one or more of water in the treatment process and compounds within the treatment process to facilitate a more complete reactions. The reaction facilitation device may be configured to impart a force, field or energy to facilitate reaction products within the treatment process to form preferentially as suspended particulates. Reaction facilitation devices may include, but are not limited to, electric, piezoelectric, magnetic, electro-magnetic, sonic and ultrasonic, device, and may be utilized to induce a response from the water or the chemical components to form suspended particulate from the chemical components. Absent the use of the reaction facilitation devices, the formation of the suspended particulate would generally be limited by chemical equilibria between the chemical components and resultant particulate compounds. The formation of the compound can be described by metric tools such as Omega-S and SPI. The proper operation and placement of these reaction facilitation devices can be coupled with additional chemical inputs to drive chemical reactions to completion, or drive the removal of specific chemical components known to adversely affect dewatering operations or polymer use. Omega-S and SPI may provide additional insight into the appropriate dosing regimens of magnesium compounds to remove the desired chemical components in conjunction with the reaction facilitation devices.

As generally described above, the present disclose may, in some example aspects, provide approaches for improving and/or enhancing biosolids dewatering and/or optimizing the usage and/or quantity of polymer amendments (e.g., polymer dewatering agents) utilized in biosolids dewatering processes. In some implementations, aspects of the present disclosure may be utilized in connection with biosolids treatment and dewatering processes that may include one or more of metal salts treatment, polymer conditioning, dewatering equipment, digestion, and the like. In some implementations, the present disclosure may include the use of specialized grades of magnesia, and/or other magnesium compounds, as well as analytical tools and techniques that may allow improving solids quality, chemical optimization, polymer optimization and solids and nutrient re-use in connection with water and/or wastewater treatment operations. In some implementations, the present disclosure may involve the utilization of magnesia, and/or other magnesium compounds, applied to wastewater treatment biosolids, whether undigested, digested anaerobically, or digested aerobically, or some combination or variation thereof, including post aerobic treatment of anaerobically digested solids. In some implementations, methods may be provided that may include a combination of metal salts, including, but not limited to ferrous and ferric salts (sulfate and chloride), aluminum salts (aluminum sulfate, alum) and others. Further, in some implementations, systems and method consistent with the preset disclosure may utilize existing polymer technology employed in connection with a water and/or wastewater treatment plant or process and/or may provide recommendations of polymer modification that may be utilized in connection with a water and/or wastewater treatment plant or process.

Consistent with some implementations, the present disclosure may include measuring parameters including, but not limited to pH, alkalinity, Mg, ortho-phosphorus, total phosphorus, ammonia, total nitrogen, total solids, polymer consumption, metal salt consumption, etc., in locations in and around a solids treatment processes and/or storage facility that may include one or more of pre-digestion, post digestion, sludge storage tanks and post dewatering equipment. Dewatering equipment may include belt filter presses, plate frame presses, centrifuges, or any combination or variants thereof.

Consistent with some implementations, the present disclosure may include measuring any of the above parameters at a bench scale level, and utilizing prescribed doses of magnesia to measure a delta between pre and post treatment parameters. Modeling tools, such as the struvite precipitation index—StruPI or SPI (Bowers, Barnes, Madolora) may be utilized to determine desired and/or optimal dosages of magnesia to the systems to be treated. Further, consistent with some implementations, the present disclosure may include using the StruPI to generate values which may then be utilized to design a dewatering program utilizing magnesia and/or other magnesium compounds, or combinations of magnesia (and/or other magnesium compounds) and/or metal salts and/or polymer agents, to improve and/or optimize solids dewaterability and improve the overall quality of the biosolids.

Figure 2:
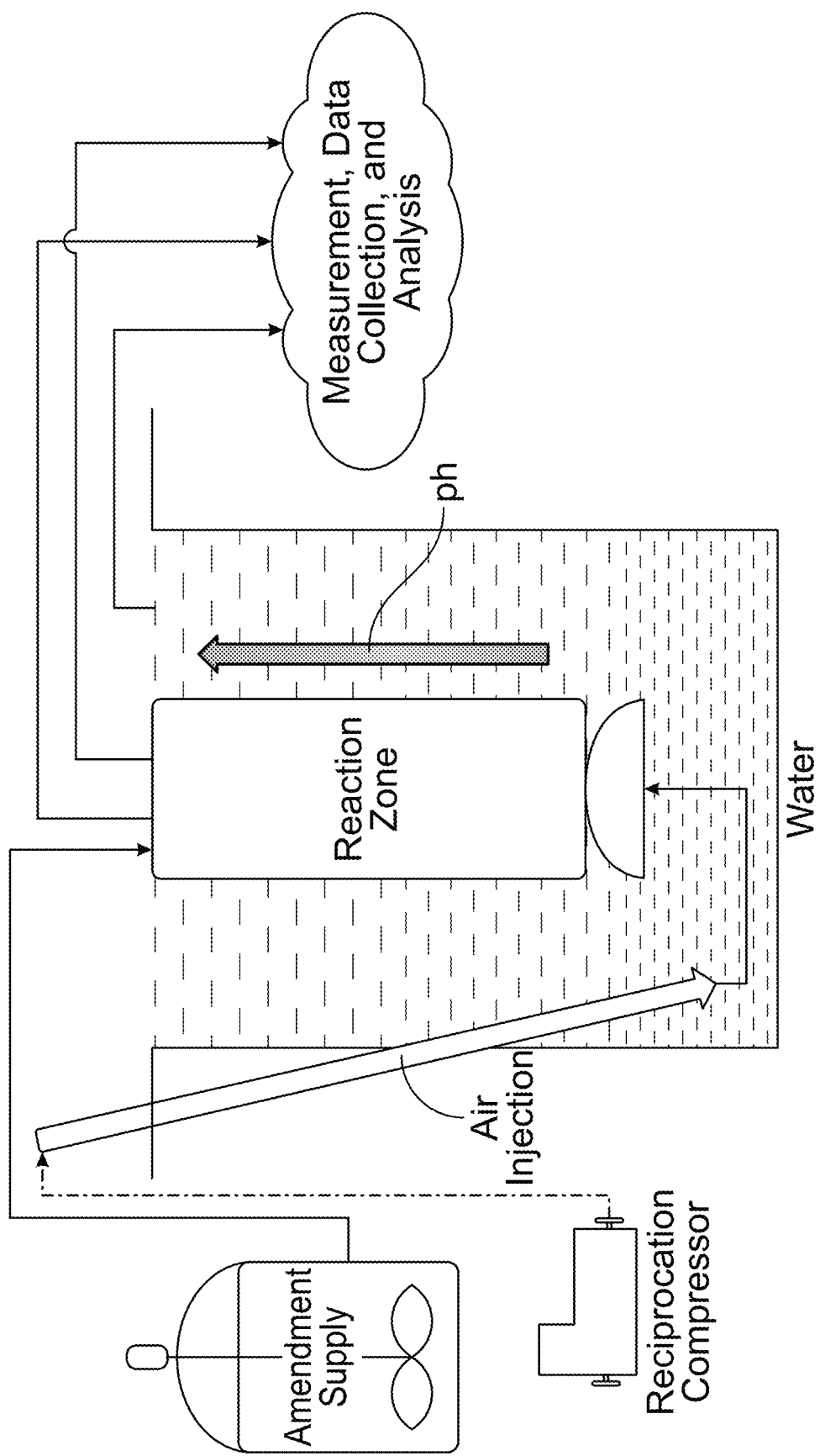
FIG. 2 diagrammatically depicts a digestion reactor including a reaction zone exhibiting an pH gradient, according to an example embodiment.

In some instances, stored sludge, post digestion, it is recognized that the stored water-borne sludge may contain $CO_2$ as a remnant of the previous digestion process, either aerobic or anaerobic, but particularly anaerobic digestion. In some such circumstances, example embodiments of the present disclosure may employ pH variation, e.g., which may be induced mechanically (e.g., as through introduction of air or a mechanical agitation system), and/or chemically (e.g., through the addition of chemistries including, but not limited to, metal salts, which may serve to reduce pH, or alkalis including but not limited to, magnesia which may serve to increase pH). For example, and referring also to FIG. 2, and illustrative example embodiment is shown including a digestion reactor including a reaction zone having a pH gradient. As shown, compressed air may be injected through the reaction zone.

In some instances, water and/or wastewater treatment plants may utilize a variety of treatment methodologies in the removal of contaminants or recovery of reusable resources and components. These methods may include physical, biological, and chemical processes and in some instances, combinations of physical, biological and chemical treatment processes. The viability of such processes is often based on improving and/or optimizing costs and effectiveness of treatment technologies, with and/or without amendments. In this regard, in some aspects, the present disclosure may relate to improving and/or optimizing the operation, effectiveness, and/or cost effectiveness of a water and/or wastewater treatment plant, operation, and/or process. Such processes may include, but are not limited to, alkaline and/or pH monitoring and feedback processes. Consistent with some aspects of the present disclosure, magnesia (and/or other magnesium compounds) may be utilized as an alkaline agent (either alone or in combination with other alkaline agents) in the treatment of water and/or wastewater. In some implementations, magnesia (and/or other magnesium compounds) may be utilized in various combinatorial processes of chemistry and biological processes, for example, due to the challenges of pH excursion and other unwanted and/or less desirable chemical reactions associated with other alkaline agents, such as, but not limited to, caustic soda, lime, potash, soda ash, bicarbonates, et al.

Consistent with some aspects and/or implementations, the present disclosure may provide methods for the use of magnesia (and/or other magnesium compounds), and/or other alkaline agents to improve, and/or optimize, water and/or wastewater treatment processes. According to some aspects and/or implementations, such methods may include data monitoring along with one, or both, of manual and automatic feedback control, and compositions of magnesia (and/or other magnesium compounds), alkaline agents and other chemistries including, but not limited to, metal salts (Fe and Al), polymers, oxidizers, cation amendments, scale control chemistry, precipitation control chemistry, and the like, to accomplish improved, and/or optimal, operation of the water and/or wastewater treatment plant. In some implementations, methods consistent with the present disclosure may not simply involve the use of magnesia (and/or other magnesium compounds) in wastewater, but may further involve connecting the various grades (i.e., reactivities) of alkaline treatments, with specific modelling, application, treatment, monitoring and optimization tools in order to achieve a desired result. In some embodiments, these desired results may include, but are not limited to: meeting acute and long term plant discharge limits, improving process performance for energy use, inorganic solids production, organic biosolids production, nutrient removal, nutrient recovery, energy recovery, nutrient amendment of reusable solids, conditioning of solids for dewatering, reduction of polymer costs for conditioning of solids, improved dewatering of biosolids, improved dryness of dewatered solids, and others.

Consistent with some aspects of the present disclosure, illustrative example aspects may include, but are not limited to, methods for utilizing magnesia (and/or other magnesium compounds) in physical, biological and chemical processes, methods for collecting data, which may include but is not limited to pH, alkalinity, hardness, polymer use, flocculating chemical use, methods for utilizing collected data in models, calculators, formulas and providing feedback data analysis and process control strategies, and compositions utilized in the treatment of water and/or wastewater.

Consistent with the foregoing, in one illustrative example embodiment, a wastewater treatment process to be treated may be improved and/or optimized using pH and alkalinity measurements for control with total process cost and efficiency determining final operating criteria. For physical, biological, and chemical processes, the selection of the alkaline agent may dictate application points, application methodology, data collection methodology, process control method and overall efficiency of the process. For example, the use of caustic soda in an aqueous medium may create a substantial pH gradient at the point of injection, and a zone of elevated pH (hot zone) that facilitates chemical, physical and biological reactions that may differ from the reactions in the surrounding bulk solution. Either or both, desired and undesired reactions may occur in either or both, the "hot zone" or the bulk solution, and may be controlled by how and where the chemical is injected, the mixing actions within the bulk solution, whether uniform or dynamic, and the measurement and monitoring methods utilized for process control.

For example, the selection of feed location and method of feed may be based on trial and error measurements within the system to be treated, or through the use of modelling tools that take into account the nature of the chemistry (e.g., the alkaline agent) to be applied, the nature of the system to be treated and the desired reaction results in one, or both, of the hot zone and the bulk solution. In some circumstances the reactions that occur in the hot zone may be generally considered undesirable. In those circumstances, the size of the hot zone may be modified intentionally by changing how and where the chemicals are applied. Further, the chemistry of the systems to be treated may be affected by the inorganic and organic chemical and particulate characteristics of the influent streams of the treatment process. These influent streams may cause substantial variations in the treatment process that affect chemical selection, as well as chemical feed location and methodology. Because of the chemical nature of caustic soda, proper optimization of the treatment process utilizing caustic soda may include the placement and use of multiple pH probes, in proximity to the injection point, to monitor the size of the hot zone, and at various points throughout the treatment process to insure favorable pH and alkalinity for the desired chemical, physical and biological reactions to occur in the bulk solution. Using novel conventional modelling tools, the characteristics of hot zones created by different chemistries may generally be discounted or disregarded in the overall analysis of the efficiency of the process, which may include not just evaluation of contaminant removal, but also the resultant liquid and solid streams and subsequent treatment requirements of those streams. Consistent with some embodiments of the present disclosure, the characteristics of hot zones and the chemistries being utilized may be taken into account during modelling and/or treatment. In the case of using caustic soda in biological processes, special attention may be given to the fraction of biomass, or activated sludge, lost to the chemical conditions of the hot zone. As the size of the hot zone reduces the working biological capacity of the treatment process, an effort may be made to reduce hot zone size produced by caustic soda. Operationally, many plants may overcome the size of the hot zone, by carrying a larger total quantity of biomass, which may have the added detriment of increasing total quantity of solids, inorganic and biomass, that is required to be treated with polymer, dewatered and disposed. Additionally, polymer use and dewatering efficiency may be further affected by Na+ cations contributed to the water through the use of caustic soda. Consistent with some embodiments of the present disclosure, chemistries (such as alkaline agent and the like), application locations and techniques, and the like may be adjusted to control the size of the hot zone, e.g., which may allow for a relatively smaller quantity of biomass to be carried by the system. Total operational efficiency of the wastewater processing plant may be evaluated by including the specific costs of the process treated by the chemical addition, but also subsequent processes that may have costs and operational efficiency impacted as well. Similar considerations may apply to other alkaline agents, such as lime. Magnesia (and/or other magnesium compounds) may be utilized as an alkaline agent, because in some implementations, magnesia may simplify application, monitoring and/or control of the process to be treated.

While various features, embodiments, and implementations have been described, it will be understood that such description is intended for the purpose of illustration and explanation, and should not be construed as limiting on the scope of the present disclosure. Additionally, while several embodiments have been described including various features, it will be understood that the described features are susceptible to combination with features described in connection with out embodiments. As such, the features, advantages, and implementations described across the various embodiments may be combined with one another to provide additional embodiments and implementations. As such, the present disclosure should be understood to encompass any combination of features, advantages, and implementations described herein.

What is claimed is:
1. A method for treating biosolids comprising:
    measuring one or more of pH, alkalinity, magnesium concentration, ortho-phosphorus concentration, total phosphorus content, ammonia content, total nitrogen content, total solids content, total volatile solids, polymer consumption, and metal salt consumption associated with a treatment process for wastewater solids;
    determining a metal salt dosage for amending the wastewater solids based upon, at least in part, an initial ortho-phosphorus concentration and a reduction capacity to reduce one or more of a calculated Omega-S value and a Struvite Precipitation Index value to a specified level;

determining a magnesium compound dosage for amending the wastewater solids to achieve a desired condition within the wastewater solids including one or more of increasing the pH of the wastewater solids, decreasing the pH of the wastewater solids, and maintaining the pH of the wastewater solids relative to the measured pH, wherein the magnesium compound dosage is based upon, at least in part, a calculated anticipated change in the pH of the wastewater solids resulting from an addition of metal salts; and amending the treatment process with the metal salts to achieve the determined metal salt dosage and a magnesium compound to achieve the determined magnesium compound dosage.

2. The method for treating biosolids according to claim 1, wherein measuring the one or more of pH, alkalinity, magnesium concentration, ortho-phosphorus concentration, total phosphorus content, ammonia content, total nitrogen content, total solids content, total volatile solids, polymer consumption, and metal salt consumption associated with the treatment process for the wastewater solids includes measuring in a plurality of locations within the treatment process.

3. The method for treating biosolids according to claim 2, wherein the plurality of locations within the treatment process include one or more of an input to a sludge storage tank, the sludge storage tank, an output from the sludge storage tank, a digester vessel, an input to a dewatering process, and an output from the dewatering process.

4. The method for treating biosolids according to claim 1, wherein the wastewater solids include one or more of primary clarifier sludges and Waste Activated Sludges.

5. The method for treating biosolids according to claim 4, wherein the wastewater solids include one or more of pre-digestion sludges, post-digestion sludges, sludges in storage, wastewater treatment stream outputs, biosolids, pre-dewatered biosolids, and post-dewatered biosolids.

6. The method for treating biosolids according to claim 1, wherein the metal salts includes one or more of: ferrous salts, ferric salts, aluminum salts, and combinations thereof.

7. The method for treating biosolids according to claim 1, wherein the magnesium compound includes one or more of magnesium hydroxide and magnesium oxide, and combinations thereof.

8. The method for treating biosolids according to claim 7, wherein the magnesium compound includes a combination of magnesium compounds having differing reactivities.

9. The method for treating biosolids according to claim 1, wherein determining the magnesium compound dosage for amending the wastewater solids to achieve the desired condition within the wastewater solids includes determining a dosage of a combination of the magnesium compound and an additional alkaline agent.

10. The method for treating biosolids according to claim 9, wherein the additional alkaline agent includes one or more of a calcium, sodium, potassium based hydroxide, carbonate, bicarbonate, and combinations thereof.

11. The method for treating biosolids according to claim 1, further comprising selecting a polymer dewatering agent dosage for a dewatering process based upon, at least in part, a calculated pH achieved by the determined metal salt dosage and the determined magnesium compound dosage.

12. The method for treating biosolids according to claim 1, wherein amending the treatment process with the determined metal salt dosage and the determined magnesium compound dosage, includes adding the determined metal salt dosage and the determined magnesium compound dosage at one or more locations in the treatment process.

13. The method for treating biosolids according to claim 12, wherein the one or more locations in the treatment process include one or more of an input to a sludge storage tank, the sludge storage tank, an output from the sludge storage tank, a digester vessel, an input to a dewatering process, and an output from the dewatering process.

14. The method for treating biosolids according to claim 1, further comprising measuring the one or more of pH, alkalinity, magnesium concentration, ortho-phosphorus concentration, total phosphorus content, ammonia content, total nitrogen content, total solids content, total volatile solids, polymer consumption, and metal salt consumption associated with the treatment process for the wastewater solids downstream of an amendment addition location; and adjusting one or more of the metal salt dosage and the magnesium compound dosage.

15. The method for treating biosolids according to claim 1, wherein amending the treatment process further comprising adding one or more of a polymer dewatering agent, an oxidizer, a cation amendment, a scale control amendment, a precipitation control amendment, and combinations thereof, to the treatment process for the wastewater solids.

16. The method for treating biosolids according to claim 1, further comprising:

measuring hydrogen sulfide gas concentration within the wastewater solids, wherein the wastewater solids include anaerobically digested sludge held in a storage tank; and wherein determining one or more of the metal salt dosage for amending the wastewater solids includes calculating a dosage of one or more of metal salt and magnesium compound to reduce the hydrogen sulfide gas concentration to below a specified level.

17. The method for treating biosolids according to claim 1, further comprising:

calculating a desired dosing of one or more of the metal salts, the magnesium compound, and a polymer dewatering agent based upon, at least in part, the calculated Struvite Precipitation Index for the biosolids to increase dewaterability of the biosolids, wherein the biosolids include the biosolids within an anaerobic digester.

18. The method for treating biosolids according to claim 1, wherein measuring the one or more of pH, alkalinity, magnesium concentration, ortho-phosphorus concentration, total phosphorus content, ammonia content, total nitrogen content, total solids content, total volatile solids, polymer consumption, and metal salt consumption associated with the treatment process for the wastewater solids includes measuring at multiple locations within one or more of a biological reactor vessel and a storage tank, and further comprising:

calculating the Struvite Precipitation Index value for at least a portion of the multiple locations within one or more of the biological reactor vessel and the storage tank;

wherein determining the magnesium compound dosage includes calculating the magnesium compound dosage to maintain an elevated Struvite Precipitation Index value for at least the portion of the multiple locations within one or more of the biological reactor vessel and the storage tank to cause preferential struvite formation in one or more predetermined locations; and adding the magnesium compound to the biological reactor vessel to cause the preferential struvite formation in the one or more predetermined locations.

19. The method for treating biosolids according to claim 1, wherein amending the biosolids with one or more of the metal salts and the magnesium compound includes utilizing a reaction facilitation device including one or more electrical, mechanical, electro-mechanical, and electro-magnetic devices to facilitate formation of suspended particles include one or more of the metal salts and the magnesium compound.

20. The method for treating biosolids according to claim 19, wherein the reaction facilitation device is configured to one or more of:
- impart a force, field, or energy on one or more compounds within the treatment process using vibrations to facilitate more complete reactions;
- impart a force, field, or energy to influence alignment of atoms or molecules of one or more of water in the treatment process and compounds within the treatment process to facilitate a more complete reaction; and
- impart a force, field or energy to facilitate reaction products within the treatment process to form preferentially as suspended particulates.

* * * * *